US 7,598,321 B2
Oct. 6, 2009

(12) United States Patent
Talkowski

(54) ETHYLENE ACID COPOLYMER

(75) Inventor: Charles J. Talkowski, Hockessin, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 5 days.

(21) Appl. No.: 11/498,216

(22) Filed: Aug. 2, 2006

(65) Prior Publication Data
US 2007/0037924 A1 Feb. 15, 2007

Related U.S. Application Data

(60) Provisional application No. 60/706,920, filed on Aug. 10, 2005.

(51) Int. Cl.
C08L 33/00 (2006.01)
C08L 23/26 (2006.01)

(52) U.S. Cl. .............. 525/196; 525/221; 525/329.7; 525/330.3; 525/374

(58) Field of Classification Search .......... 525/196, 525/221, 329.7, 330.3, 374
See application file for complete search history.

(56) References Cited

U.S. PATENT DOCUMENTS

| 3,457,328 | A | | 7/1969 | Blatz et al. | |
|---|---|---|---|---|---|
| 3,883,472 | A | * | 5/1975 | Greene et al. | 524/151 |
| 3,904,588 | A | | 9/1975 | Greene | |
| 4,725,637 | A | | 2/1988 | Fernyhough et al. | |
| 5,089,332 | A | | 2/1992 | Feinberg | |
| 5,194,113 | A | | 3/1993 | Lasch et al. | |
| 5,210,150 | A | | 5/1993 | Prejean | |
| 5,468,532 | A | | 11/1995 | Ho et al. | |
| 6,800,688 | B2 | * | 10/2004 | Usui et al. | 525/69 |
| 7,001,957 | B2 | * | 2/2006 | McBride | 525/379 |
| 2002/0172782 | A1 | | 11/2002 | Moffitt et al. | |
| 2005/0020775 | A1 | | 1/2005 | Wu | |
| 2005/0037216 | A1 | * | 2/2005 | Chen et al. | 428/476.3 |

FOREIGN PATENT DOCUMENTS

EP 0 194 677 A2 * 9/1986

* cited by examiner

*Primary Examiner*—Robert D. Harlan

(57) ABSTRACT

Disclosed is a composition which comprises or consists essentially of a high melt index ethylene acid copolymer comprising monomer units derived from ethylene, an alkyl (meth)acrylate, a (meth)acrylic acid, and an optional comonomer. Also disclosed is a composition comprising the ethylene acid copolymer crosslinked with a polyamine, a polyvalent metal salt, or combinations thereof. Also disclosed is a solution of the ethylene acid copolymer which can be used for solutions application to substrates.

8 Claims, No Drawings

ETHYLENE ACID COPOLYMER

The application claims priority to U.S. provisional application No. 60/706,920, filed Aug. 10, 2005, the entire disclosure of which is incorporated herein by reference.

The invention relates to an ethylene acid copolymer comprising monomer units derived from ethylene, an alkyl (meth) acrylate, an acidic comonomer, and having a high melt index, to a process therefor, and to a process therewith.

BACKGROUND OF THE INVENTION

Ethylene acidic copolymers such as copolymers of ethylene, methyl acrylate, and an acidic comonomer are known. The acidic comonomer acts as an acid cure site for crosslinking. These copolymers are available from E. I. du Pont de Nemours and Company, Wilmington Del. (DuPont) under the VAMAC trademark.

The acidic copolymers of the prior art may be crosslinked and show good high and low temperature properties, and resistance to hot oils, hydrocarbon and glycol based lubricants, and hot water. See, for example, U.S. Pat. Nos. 3,883,472 and 3,904,588. These properties result in applications such as seals, spark plug boots, hose, damping devices, and cable and wire jacketing. These commercial acidic copolymers have melt indices according to American Society for Testing and Materials, ASTM D-1238 Condition E, in the range from about 2 to about 100 g/10 min. The VAMAC product is elastomeric and has glass transition points ($T_g$) in the range from about −20° C. to about −45° C. The acidic copolymers of the prior art can be crosslinked at ambient temperature, but solution solids (weight % acidic copolymer in solution) are limited due to the low MI of those acidic copolymers. A low MI corresponds to a high molecular weight and thus high solution viscosity.

It is desirable to extend the utility of such ethylene acid copolymers to potential applications where reversible crosslinking is required, to hot melt adhesive applications, to solution applied acidic copolymer applications, and to provide improved solubility in solvents, improved solution viscosity properties, and improved solid state properties by raising the MI. The present invention provides such ethylene acidic copolymers, a process therefor and processes therewith.

SUMMARY OF THE INVENTION

The invention includes a composition which comprises or consists essentially of a high melt index (MI) ethylene acid copolymer comprising monomer or repeat units of or derived from ethylene, at least one alkyl (meth)acrylate, at least one acid comonomer, and an optional comonomer wherein the acid copolymer has a melt index of greater than about 110 g/10 min., the acid comonomer includes (meth)acrylic acid, monoalkyl ester of 1,4-butene-dioic acid, or combinations thereof and the optional comonomer includes maleic acid ester, maleic anhydride, or combinations thereof.

The invention also includes a composition comprising the ethylene acid copolymer crosslinked with a polyamine or with polyvalent metal salts.

The invention also includes a solution of the ethylene acid copolymer that can be suitable for solution application to substrates.

The invention also includes a composition that can be used as an adhesive or coating, which comprises or consists essentially of an ethylene acid copolymer disclosed above and optionally a polyamine, a polyvalent metal salt, or combinations thereof.

The invention also includes a process for producing the high MI ethylene acid copolymer comprising contacting a mixture with an initiator, optionally in the presence of a telogen, under a condition effective to produce an ethylene acid copolymer wherein the mixture comprises ethylene, an alkyl (meth)acrylate, a (meth)acrylic acid, and an optional comonomer.

DETAILED DESCRIPTION

Tradenames or trademarks herein are shown in upper case.

"Alkyl (meth)acrylate" can include alkyl acrylate, alkyl methacrylate, or both. "(Meth)acrylic acid" can include acrylic acid, methacrylic acid, or both. The alkyl group can contain 1 to about 8, or 1 to 4, carbon atoms per group. For example, methyl (meth)acrylate, unless otherwise specified, can refer to either methyl methacrylate or methyl acrylate. The alkyl group has from 1 to about 8 or from 1 to about 4 carbon atoms per group.

Copolymers containing repeat units from at least one acidic comonomer are described as "acidic copolymers".

The high melt index ethylene acid copolymer can comprise about 30 to about 75, or about 45 to about 65, weight % of monomer units derived from alkyl (meth)acrylate comonomer and about 1 to about 15, or about 2 to about 10, or about 2 to about 5, weight % of monomer units derived from an acidic comonomer. Ethylene is the third component in the acidic copolymer. As such, ethylene represents essentially the remainder of the acidic copolymer relative to the required alkyl (meth)acrylate and the acidic comonomer moiety; i.e., polymerized ethylene is present in the acidic copolymers in a complementary amount.

The preferred alkyl (meth)acrylate is methyl acrylate.

The acid comonomer, which provides acid cure sites for crosslinking, comprises at least one (meth)acrylic acid, at least one monoalkyl ester of 1,4-butene-dioic acid, or combinations thereof. The 1,4-butene-dioic acid (or its ester) may exist in cis- or trans-form or both, i.e. maleic or fumaric acid prior to polymerization. Alkyl monoesters, such as one or more $C_{1-4}$ alkyl hydrogen maleates can be used.

The ethylene acid copolymer can also comprise some monomer units derived from a comonomer including maleic acid diester and maleic anhydride.

The ethylene acid copolymers of the present invention can be non-crystalline, have a $T_g$ of from about −20° C. to about 45° C., and have an MI≧about 110 or ranging from about 110 to about 1000 g/10 min. or about 200 to about 900 g/10 min. MI values are determined using the procedure in ASTM Method D-1238, as disclosed below.

The ethylene acid copolymers can be readily prepared by copolymerizing ethylene, at least one alkyl (meth)acrylate and at least one acidic comonomer described above in the presence of a free-radical polymerization initiator including for example peroxygen compounds or azo compounds.

The copolymerization may be run by continuously feeding ethylene, methyl acrylate, the acid comonomer, a free radical initiator, and optionally a solvent such as methanol or the like (see e.g., U.S. Pat. No. 5,028,674) to a reactor such as a stirred autoclave of the type disclosed in U.S. Pat. No. 2,897,183. Reactor designs other than that described in U.S. Pat. No. 2,897,183, including staged or series reactors may also be used to carry out the copolymerization. The rate of conversion may depend on variables such as the copolymerization temperature and pressure, comonomer feed temperature, comonomers employed, concentration of comonomers in the reaction mixture, and residence time for the desired yield and acid copolymer composition. It may be desirable to adjust the residence time and, in some cases, to use a telogen (a chain transfer and chain terminating agent) such as propane, to control the molecular weight. The product or product mixture is continuously removed from the reactor. After the product mixture leaves the reactor, the acid copolymer can be separated from unreacted comonomers and solvent (if used) by any methods known to one skilled in the art, e.g., vaporizing the unreacted comonomers and solvent under reduced pressure and at an elevated temperature.

"Monomer feed temperature" refers to the temperature to which a comonomer or comonomers are heated prior to their introduction into a reactor.

The ethylene acid copolymers may be produced by any process known to one skilled in the art. It can be produced by a process comprising contacting a mixture with an initiator, optionally in the presence of a telogen, under a condition effective to produce an ethylene acid copolymer wherein the mixture comprises ethylene, an alkyl (meth)acrylate, a (meth)acrylic acid, and an optional comonomer. For example, a copolymerization can be carried out in a pressurized reactor at elevated temperature, from about 170° C. to about 250° C. or about 190° C. to about 210° C. and under pressures of from about 100 MPa to about 250 MPa or about 135 MPa to about 210 MPa, with monomer feed temperatures from about 20° C. to about 90° C., or about 30° C. to about 80° C.

An initiator such as a peroxide can be used for the copolymerization process and can be dependent on the reactor operating conditions, such as temperature and pressure, comonomers used, and comonomer concentration. The initiator can be employed neat as a liquid, dissolved, dispersed, or diluted in a suitable solvent such as odorless mineral spirits or mixed with another different initiator. The concentration of initiator in a solvent can be about 1 to about 10 weight %, or about 5 weight % initiator. In a pilot scale reactor capable of producing 0.45 to 4 kg/h of resin, for example, the solution or dispersion feed rate can be from 1 to about 100 ml/h or preferably about 28 ml/h. In the reactor, the initiator can be present in about 0.0001 to about 1 weight % based on the total weight of all comonomers.

Common classes of organic peroxides useful as free radical initiators include dialkyl peroxides, peroxy esters, peroxy dicarbonates, peroxy ketals, diacyl peroxides, or combinations of two or more thereof. Examples of peroxides include di(3,3,5-trimethyl hexanoyl)peroxide, t-butyl peroxypivalate, t-butyl peroxyneodecanoate, di(sec-butyl)peroxydicarbonate, and t-amyl peroxyneodecanoate. These and other peroxides are available under LUPEROX from Arkema (Philadelphia, Pa.) or TRIGONOX from Akzo Nobel (Chicago, Ill.). Similarly, an azo initiator can be used.

After the continuous operation has reached a steady state, the total conversion of monomers to the acid copolymer can vary from 5 to 20 wt %. The MI of an acid copolymer is roughly related to its molecular weight, the lower the MI the higher the molecular weight. MI values vary depending on polymerization conditions and the use of a telogen additive. For example, MI can be $\geqq 110$ g/10 min. or ranging from about 110 to about 1000 g/10 min. or about 200 to about 900 g/10 min.

The conversion of ethylene in the copolymerization can be lower than that of the alkyl (meth)acrylate or acid comonomer, an acid copolymer may not be proportional to the monomer feed composition. The incorporation of the acid comonomer, expressed as percent by weight, can be determined by end-point titration using a phenolphthalein indicator (or the like) with a standardized methanolic caustic titer and a known weight of acid copolymer dissolved in a heated xylene/butanol mixture. The weight percent of methyl acrylate incorporated can be determined by proton nuclear magnetic resonance (NMR) or Fourier-transform infrared (FTIR) analysis after calibration by NMR. The ethylene content can be determined by difference. Such analytical methods are well known to those skilled in the art.

The acid copolymer made in the high-pressure autoclave may contain some comonomer residuals, such as alkyl (meth)acrylate comonomer. Removal of comonomer residuals is generally known in the art as a "devolatilization" or finishing step. For small laboratory scale preparations, devolatilization can be accomplished by heating in a vacuum oven for a period of time (for example, heating to about 100° C. at a reduced pressure of about 15 to about 20 such as about 17 kPa for about 1 to about 10 hours). For larger-scale preparations, the residuals can be removed by processing through a single or twin-screw extruder with vacuum ports at elevated temperature. Optionally in finishing the acidic copolymer a release agent may be added at up to about 1 wt % based on the acid copolymer weight in order to improve handling.

The high MI ethylene acid copolymers can provide higher solids and lower viscosity solutions in suitable solvents including, but not limited to, toluene, ether, acetone, tetrahydrofuran, and combinations of two or more thereof. Such high MI permits the use of the acid copolymers in solution applications where the solution has high solids, typically at least 15% solids by weight.

The higher MI of the acid copolymers can be controlled by the use of about twice the amount of initiator during the copolymerization compared with the procedures disclosed in U.S. Pat. No. 3,904,588, incorporated herein by reference. The MI can also be controlled by the use of one or more telogens such as propane, methanol, butane, ethanol, and combinations of two or more thereof, or other chain transfer agents. Again, compared with the disclosure of U.S. Pat. No. 3,904,588, about a 70% higher concentration of chain transfer agent is used.

For example, a high MI acid copolymer comprising comonomer units derived from ethylene, methyl acrylate, and acrylic acid or from ethylene, methyl acrylate, maleic acid monomethylester, maleic acid monoethylester, and maleic acid monopropylester can be produced by the use of an autoclave in which a homogeneous polymerization environment can be agitated at about 250 rpm. Further for example, ethylene can be fed as a compressed gas phase to maintain a pressure as disclosed above, at a temperature of about 40° C. and at a rate of about 4.5 to about 45 kg/h, or about 11.3 kg/h. The other monomer feeds can be about the same temperature. The polymerization temperature can be about 170° C. to about 250° C., or about 190° C. to about 210° C. The alkyl (meth)acrylate and acid comonomer can be fed at about 0.45 to about 9 kg/h, such as at about 0.9 to about 2.3 kg/h. The acidic monomer can be fed at about 0.005 to about 4.5 kg/h, preferably at about 0.045 to about 0.22 kg/h as a liquid phase under pressure. The alkyl (meth)acrylate and acidic comonomer are fully converted. Melt index can be controlled by the reactor temperature and pressure, levels of solvents, chain transfer agents, and free radical initiators. Methanol at about 0.45 to about 1.4 kg/h and propane at about 0.23 to about 9 kg/h are fed simultaneously as solvent and chain transfer agents.

The high MI acid copolymers of the present invention can be crosslinked. The term "vulcanization" is sometimes used to describe this process, but "crosslinking" is used herein because, for acid copolymers disclosed herein the crosslinking process can be conducted over a broad temperature range of about 0° to about 80° C. Ambient temperatures of 20° to 25° C. can be used, but optionally heat may be applied to facilitate mixing. The term "vulcanization" suggests that heat is required and covalent bonds are formed. A blend of the high MI acid copolymer and a curing agent, optionally along with fillers or other additives can be subjected to an effective time and pressure, such as at about 150° to about 200° C., at a pressure of about 200 to about 2000 psi (1.4-13.8 MPa), and for a time of about 3 to about 10 minutes, to achieve crosslinking of the high MI ethylene acid copolymer. The crosslinking can occur at lower temperature, even at ambient temperature and pressure.

Curing or crosslinking agents useful in the practice of the present invention include diamines or multifunctional amines or multivalent metal ions, or combinations of two or more thereof. The amine function can include at least one primary amine, secondary amine, tertiary amine, polyamine, or combinations of two or more thereof. An example of a small diamine that may be used is hexamethylene diamine. Amino compounds that aggregate in situ thereby providing polyamine functionality can be used. Oligomeric polyamines and other organic molecules containing more than one amine group such as poly[[6-(1,1,3,3-tetramethylbutyl)amino-s-triazine-2,4-diyl][(2,2,6,6-tetramethyl-4-piperidyl)imino]hexamethylene[(2,2,6,6-tetramethyl-4-piperidyl)imino]], (CAS 70624-18-9, available as CHIMASSORB 944 FD from Ciba Specialty Chemicals, Tarrytown, N.Y.) can also be used. An oligomeric polyamine includes about 2 to about 100 amine groups. Polyamines such as CHIMASSORB 944 can have a high molecular weight. In applications where extraction or other loss of a small diamine could occur, the high molecular weight polyamine remains to crosslink the acidic copolymer.

For example, an oligomeric polyamine above can be combined slowly with an acid copolymer solution or dispersion at a temperature disclosed above such as ambient temperature. The acid copolymer solution or dispersion thickens as the polyamine is combined. The stoichiometry range for polyamine addition can be from about 20% neutralization of the acidic copolymer up to about 125% of theoretical acid content.

The acid copolymers may be combined with a curing agent such as a polyamine by solution or dispersion preparation (dissolving or suspending the acid copolymer in a solvent, e.g., toluene, tetrahydrofuran, or combinations of two or more thereof). The acid copolymer content of the solution or dispersion can range from about 5 to about 80 or about 15 to about 30 wt %. Solution or dispersion may be heated to accelerate dissolution or dispersion of the acid copolymer. A polyamine solution or dispersion can then be combined. The polyamine can be dissolved or dispersed in the same solvent as the acid copolymer.

In contrast to the labile cross-linking effects of a polyamine, a monoamine provides no crosslinking. For instance, the addition of 4,4' bis(alpha, alpha dimethylbenzyl) diphenylamine (available as NAUGARD 445 from Crompton Chemicals, Middlebury, Conn., USA) to an E/MA/AA copolymer solution had no effect on the solution viscosity.

Polyvalent metal cations for use as curing agents include, but are not limited to, one or more of aluminum, zinc, magnesium, and calcium ions. Divalent ion sources can be formates, acetates, hydroxides, nitrates, carbonates and bicarbonates. From about 20% to about 70% of the carboxylic acid groups in an acid copolymer are neutralized by one or more multivalent cations.

The frequently used trivalent cation is aluminum cation. The source of trivalent cation may be any convenient derivative such as carboxylates, alkoxides, chelated compounds and hydroxides. In the case of aluminum cation the sources include aluminum acetate, aluminum isopropoxide and aluminum acetylacetonate.

Crosslinking (reaction) of the ion sources with the carboxylic acid containing polymers may be conducted in a solvent, by melt blending at elevated temperatures, or using a biphasic system where the cation source is dissolved or dispersed in an aqueous phase. The cation source may be finely-divided to aid mixing. For example, room temperature (about 25° C.) crosslinking can be effected by the use of aluminum acetylacetonate containing about a 5-fold to about a 10-fold excess of acetylacetone (2,4-pentanedione). Such blends can be useful in solution casting/solvent evaporation techniques. When the acetylacetone is allowed to evaporate, aluminum cations are formed and crosslinking occurs. Prior to crosslinking, evaporation may be suppressed by excess acetylacetone thereby inhibiting the crosslinking process. Other metal acetylacetonates may be used, and in some cases, a large excess of acetylacetone can be used to inhibit crosslinking. With the use of metal cations for crosslinking and in contrast to the proportion of amine used in the crosslinking process described above, the stoichiometry can be the use of about 20 to about 70% (or about 60% or about 55%) of the cation to neutralize the carboxylic acid content of the acid copolymer.

In the context of this disclosure the percent neutralization data are presented using the assumption that each cation reacts with the maximum number of carboxylic acid groups calculated from its ionic charge. That is, it is assumed, for example, that $Al^{+3}$ will react with three carboxylic acid groups, and that $Mg^{+2}$ and $Zn^{+2}$ react with two.

Commercial elastomeric polyacrylates of high molecular weight (showing relatively low MI values in the range from about 2 to about 100 g/10 min) can also be crosslinked with polyamines. The polyacrylates are copolymers comprising repeat units derived from one or more acrylate monomers and a cure site monomer, which may contain an acid group or cure site. Such cure site monomers can include monoesters of maleic acid and fumaric acid. The monomers include alkyl (meth)acrylates such as methyl acrylate, ethyl acrylate, propyl acrylate, butyl acrylate, or combinations of two or more thereof and optionally low levels of other acrylate monomers. The alkyl (meth)acrylate level can be between about 10 mole % to about 80 mole %. For example, a polyacrylate derived from ethyl acrylate and butyl acrylate can comprise 45 mol % and about 75 mol % derived from ethyl acrylate and about 55 mol % and about 25 mol % butyl acrylate or ethylate acrylate level from about 50 mol % to about 60 mol % with the butyl acrylate between about 50 mol % and about 40 mol %. The cure site monomer level can be about 1 to about 2.5 mol %.

Various additives can be present in the composition such as antioxidants and thermal stabilizers, ultraviolet (UV) light stabilizers, pigments and dyes, fillers, anti-slip agents, plasticizers, other processing aids, and the like may be advantageously employed. Antioxidants and ultraviolet light absorbers may also be present for applications where oxidizing or UV degradation conditions are encountered.

The composition, crosslinked or not, may comprise about 0.1 to about 40 weight % of a filler and/or an antioxidant such as, for example, a phosphorus ester antioxidant, a hindered phenolic antioxidant, an amine antioxidant, or combinations of two or more of thereof. The phosphorus ester compound can be, for example: tri(mixed mono- and dinonylphenyl) phosphite, tris(3,5-di-t-butyl-4-hydroxyphenyl)phosphate, high molecular weight poly(phenolic phosphonates), and 6-(3,5-di-t-butyl-4-hydroxy)benzyl-6H-dibenz[c,e][1,2]oxaphosphorin-6-oxide.

The hindered phenolic compounds include, for example, the following: 4,4'-butylidenebis(6-t-butyl-m-cresol), 1,3,5-trimethyl-2,4,6-tris-(3,5-di-t-butyl-4-hydroxybenzyl)benzene, 2,6-di-t-butyl-dimethylamino-p-cresol, and 4,4'-thiobis-(3-methyl-6-t-butyl-phenol).

Suitable amine antioxidants include, among others, the following: polymerized 2,2,4-trimethyl-1,2-dihydroquinoline; N-phenyl-N'-(p-toluenesulfonyl)-p-phenylenediamine; N,N'-di(β-naphthyl)p-phenylene diamine; low temperature reaction product of phenyl (β-naphthyl)amine and acetone; and 4,4'-bis(α,α-dimethylbenzyl)-diphenylamine.

Any fillers known to one skilled in the art can be used.

The composition can contain about 0.1 to 40 weight % of dispersed pigments, for example, carbon black, barium sulfate, magnesium silicate, silica, or combinations of two or more thereof.

The composition can be produced by mixing in equipment including a two-roll mill or a Banbury mixer, including adding the curing agent and other additives. If the compositions are prepared in a solvent, such additives may be added at that time.

Films or coatings can be readily prepared from a solution of a curing agent (e.g., a polyamine or multivalent cation), acid copolymer, and optionally one or more additives on a suitable surface or substrate. Suitable substrates include metal, glass, ceramic, tile, brick, concrete, wood, masonry, fiber, leather, plastics, rubber and other elastomers, or stone.

For films, the solution can be applied, poured, brushed, rolled, or sprayed onto a supporting and non-stick surface and the solvent allowed to evaporate at ambient temperature. When the solvent has evaporated substantially for the sample film to be removed from the support, the film can be removed and, if necessary, further dried. ASTM D1708 tensile bars may be die cut for measurement of mechanical properties, such as stress and strain tests. A thickness for such test bars after drying can be from about 0.4 mm to about 2 mm, such as about 1 mm. MI tests can be run on such die cut bars.

For adhesive applications, a combination of the acid copolymer with a curing agent (e.g., a polyamine) can increase flow behavior and solution viscosity of the acid copolymer. It can be desirable to control the flow behavior and solution viscosity in the application of coatings to surfaces. Substrates that can be coated can further include fabrics and fibers, rubber goods and articles, metal surfaces, wood surfaces and paper substrates. The coating can be applied as disclosed above for films such as by pouring the solution on the substrate and, if necessary, spreading with a doctor knife (for example to impregnate a fabric). The solution can be wiped or padded onto a substrate such as rubber to produce a coating, or spray, brush, or roller coating systems can be used.

Wishing not to be bound by theory, vulcanization of elastomers includes thermal generation of permanent covalently bonding, the crosslinking disclosed here includes ionic bonding thereby providing cross-linked compositions that are held together with the relatively labile and heat-reversible acid-to-base reactions of the acidic sites in the acidic copolymer and the basic sites in the polyamines. The crosslinking, as disclosed above, can be carried out at ambient temperature. Such relatively low strength (compared to vulcanization) acid-base bonds are in dynamic equilibrium and therefore can be reversible under suitable operational conditions, for instance by higher temperatures. The crosslinking can progressively be lost as temperatures rise through the range of above about 80° C. or above about 100° C., up to about 200° C., the actual range being somewhat dependent on the specific combination of polyamine and acidic copolymer. This is a reversible crosslinking because the crosslinking can be restored as the temperature returns to lower temperature.

Again, wishing not to be bound by theory, another characteristic of such reversible crosslinking that differs markedly from vulcanization is that, as a crosslinking agent (e.g., polyamine) is mixed with an acid copolymer, the viscosity increases but copolymer does not become insoluble. The reversibly crosslinked polyamine (or multivalent cation)/acidic copolymer in solution can be applied to a surface and crosslinking increases as the solvent evaporates. The reversibly crosslinked polyamine/acidic copolymer remains solvent-soluble. In contrast, a covalently vulcanized copolymer may swell in contact with a solvent, but not dissolve, and application as a coating cannot be practical.

The high MI acidic copolymers disclosed herein may have increased acid functionality due to the concentration of the acidic monomer used in the copolymer and the lower molecular weight of (meth)acrylic acid comonomer in comparison to the alkyl hydrogen maleate monomer used in the ethylene/methacrylate/alkyl hydrogen maleate copolymers known in the art. The density of the acid cure sites may be higher in the high MI acid copolymers, resulting in enhanced "reversible crosslinking" with a curing agent.

Further wishing not to be bound by theory, the high MI acid copolymers can be more readily soluble in solvents such as those described above, providing higher solids and lower solution viscosity and are readily modified by polyamines or metal ions to change the solution viscosity and solid state properties to meet a range of applications in hot melt adhesive systems and solution applied acid copolymers. An example of a solution application where high solids and relatively low viscosity is necessary is in fabric coatings and coatings for elastomers.

While the high MI acid copolymers can be useful as components in room-temperature crosslinking formulations, they can also be used for other applications, for instance window glazing, and in blends with an ionomers such as SURLYN for improved thermoplastic elastomer toughness.

Ethylene acid copolymers may also be converted to aqueous dispersions, where flammability, air pollution by volatile organic compounds, or both, are concerns. The preparation of aqueous dispersions can be carried out by methods well known to one skilled in the art including the dispersion of a solution of the acid copolymer in an essentially water-insoluble solvent or mixture of solvents, such as toluene, optionally in the presence of an emulsifying agent. Evaporation of the solvent (as the toluene-water azeotrope, b.p. 84° C., in this specific case) and, if necessary, part of the water, leaves the acid copolymer dispersed in the water. Alternatively, the solvent can be an azeotrope-forming system such as benzene/isopropyl alcohol, when the mixed solvents are then removable as ternary azeotropes with water, the ternary azeotropes having a b.p. about 67° C. in both cases. U.S. Pat. No. 3,562,196 discloses the preparation of dispersions of an ethylene/methacrylic acid copolymer using such techniques.

The crosslinking properties of diamines and multifunctional amine polyamines as disclosed above can be applied to ethylene/alkyl (meth)acrylate/acid cure site copolymers having MI values of less than 110 g/10 min. Table 1 shows the enhancement of mechanical properties in a commercial ethylene/methacrylate/acid cure site copolymer (prepared according to the method disclosed in U.S. Pat. Nos. 3,883,472 and 3,904,588 having a MI of less than 100 g/10 min.) when compounded with CHIMASSORB 944.

EXAMPLES

Melt Index Measurement

Melt Indices were determined according to the ASTM D-1238, Condition E, using a 0.0823 inch (2.09 mm) orifice at 190° C. and 2.16 kg weight. Units are g/min.

Acidic copolymer compositions are shown in the format E/MA/AA 43/55/2, wherein the proportions of monomers in the acidic copolymer (determined by analysis as described above) are shown in weight %. E/MA/AA 43/55/2 indicates an acid copolymer containing repeat units comprising 43 weight % ethylene, 55 weight % methyl acrylate, and 2 weight % acrylic acid.

Example 1

E/MA/AA 43/55/2

Acid copolymers were prepared in a high-pressure autoclave operating at 145 MPa and 195° C. Monomers were fed at 40° C. and the autoclave was run in adiabatic mode at 195° C. Ethylene was fed at 11.3 kg/h and methyl acrylate was fed at 2.22 kg/h. Initiator, di-sec-butyl peroxydicarbonate as a 5 weight % solution in odorless mineral spirits, was fed at a rate that maintained temperature, about 28 ml/h. Propane was used as a telogen to help control the MI of the acid copolymer at a 726 g/h feed rate. Methanol was added at a nominal 3 weight % of feed ingredients to aid in acid copolymer solubility in the reactor. For acrylic acid as the third monomer, the feed rate was 181 g/h.

On exiting the high-pressure autoclave the effluent was passed into a low-pressure separator to remove unreacted monomers and other volatiles. The product was then extruded into containers. The MI of the E/MA/AA was 400 g/10 min.

Example 2

E/MA/AA 43/55/2

Example 2 was prepared as described for Example 1 except that the autoclave temperature was 205° C., the 5% initiator solution feed rate was 30 ml/h, the propane feed rate was 907 g/h, and the acrylic acid feed rate was 181 g/h. Other feeds and conditions were as in Example 1. The acid copolymer was isolated as described for Example 1. The MI of the E/MA/AA was 800 g/10 min.

Example 3

E/MA/AA 41/55/4

Example 3 was prepared as described for Example 1 with an autoclave temperature of 195° C., the 5% initiator solution feed was 30 ml/h, the propane feed rate was 136 g/h, and the acrylic acid feed rate was 381 g/h. Other feeds and conditions were as in Example 1. The acidic copolymer was isolated as described for Example 1. The MI of the E/MA/AA was 400 g/10 min.

A sample of this acid copolymer (20 g) was dissolved in toluene (100 ml) with stirring to make a solution. CHIMASSORB 944 polyamine (5 g) was dissolved separately in toluene (50 ml). The polyamine solution (6 ml, corresponding to 3% CHIMASSORB based on the acid copolymer weight) was added dropwise to the acid copolymer solution. The acid copolymer solution thickened as the polyamine solution was added.

Example 4

Example 4 was prepared as described for Example 1 except that the reactor temperature was 205° C., the 5% initiator solution feed was 30 mL/h, the propane feed rate was 544 g/h, and the acrylic acid feed rate was 381 g/h, and the monomer feed temperature was 50° C. Other feeds and conditions were as in Example 1. The acid copolymer was isolated as described for Example 1. The MI of the E/MA/AA was 800 g/10 min. and the composition by weight was E/MA/AA (41/55/4).

Example 5

The same equipment, procedures and MI control techniques are used to produce E/MA/MAA acid copolymers as described for Example 1 with a MI of 400 g/10 min. Methacrylic acid (MAA, feed rate 218 g/h) replaces the acrylic acid in the feed stream on a molar basis. All other conditions and feeds are as in Example 1. This is an example where MAA replaces AA on a molar basis.

Example 6

The same equipment, procedures and MI control techniques are used to produce E/MA/MAA acid copolymers as described for Example 2 with a MI of 800 g/10 min. Methacrylic acid (MAA, feed rate 218 g/h) replaces the acrylic acid in the feed stream on a molar basis. All other conditions and feeds are as in Example 2. This is an example where MAA replaces AA on a molar basis.

Example 7

The same equipment, procedures and MI control techniques are used to produce E/MA/MAA acid copolymers as described for Example 3 with a MI of 400 g/10 min. Methacrylic acid (MAA, feed rate 381 g/h) replaces the acrylic acid in the feed stream on a molar basis. All other conditions and feeds are as in Example 3. This is an example where MAA replaces AA on a molar basis.

Example 8

The same equipment, procedures and MI control techniques are used to produce E/MA/MAA acid copolymers as described for Example 4 with a MI of 800 g/10 min. Methacrylic acid (MAA, feed rate 381 g/h) replaces the acrylic acid in the feed stream on a molar basis. All other conditions and feeds are as in Example 4. This is an example wherein MM replaces AA on a molar basis.

Example 9

E/MA/EHM 41/55/4

Example 9 was prepared as described for Example 1 with a reactor temperature of 195° C., the 5% initiator solution feed rate was 28 ml/h, the propane feed rate was 771 g/h, the methyl acrylate feed rate was 2.18 kg/h and the ethyl hydrogen maleate (EHM) feed rate was 109 g/h. Other feeds and conditions were as in Example 1. The MI of the E/MA/EHM was 400 g/10 min.

Example 10

E/MA/EHM 41/55/4

Example 10 was prepared as Example 9 except that the reactor temperature was 205° C., the monomer feeds were fed at 50° C., the methyl acrylate feed rate was 218 g/h and the ethyl hydrogen maleate feed rate was 91 g/h. All other conditions and feeds were as in Example 9. The MI of the E/MA/EHM was 800 g/10 min.

Example 11

E/MA/AA acid copolymer (20 g, prepared as described in Example 3, containing by weight 41% ethylene, 55% methyl acrylate, and 4% acrylic acid, and having a MI of 400 g/10 min.) was dissolved in toluene (100 ml) with stirring to make an acid copolymer solution. Polyamine (5 g) was dissolved in toluene (50 ml) to make a CHIMASSORB 944 solution. The CHIMASSORB 944 solution (approximately 6 ml, corresponding to 3 weight % CHIMASSORB based on the weight of the acidic copolymer) was added dropwise to the acid copolymer solution at ambient temperature. The mixture thickened as the polyamine solution was added indicating a crosslinking occurred.

These solutions of crosslinked acid copolymer were used to cast films having a 5 mil (0.127 mm dry thickness) on which tensile tests were run. The solution was poured into an aluminum tray coated with TEFLON FEP resin, the solvent was allowed to evaporate at ambient temperature. When dry, the crosslinked acid copolymer film was removed and its mechanical and rheological properties measured (Table 1). A second portion of the solution of the crosslinked acid copolymer was evaporated to dryness under reduced pressure and elevated temperature on a rotary evaporator to remove the solvent. When dry, the mechanical and rheological properties of the crosslinked acid copolymer were measured (Table 1).

Example 12

A commercially available VAMAC G copolymer, having a MI of approximately 8 g/10 min. and obtained from DuPont (100 g), was added to a roll mill with the operating temperature set to ensure molten acid copolymer (about 100-140° C.). Once banded, the gap between the rolls was decreased to create a bank of the copolymer. CHIMASSORB 944 (2 g) was added to the mill in four equal portions over a 15-minute period. After each addition, the mill sample was mixed by standard milling, cutting, and mixing operations to insure uniform distribution of the polyamine in the acidic copolymer. After the last addition, mixing was continued for 5 min., when it was removed from the mill. The blended polyamine/acid copolymer mix was used to prepare polymer film by hot pressing between two TEFLON-coated aluminum sheets. The film was used in stress/strain tensile and rheology tests (Table 1, showing 2 shear rate data points).

TABLE 1

Mechanical Properties.

| Shear rate, s$^{-1}$ | Viscosity (Pa·s, 90° C.) | | |
|---|---|---|---|
| | VAMAC G | 2 wt % CHIMASSORB 944 | |
| | | VAMAC G milled[a] | VAMAC G solution mixed[a] |
| 20 | 8853 | 9867 | 15114 |
| 500 | 1020 | 1075 | 1515 |

Mechanical properties: Stress/strain

| Property | VAMAC G | VAMAC G with polyamine[b] |
|---|---|---|

TABLE 1-continued

Mechanical Properties.

| Modulus at 100% elongation | 207 kPa | 365 kPa |
|---|---|---|
| Modulus at 200% elongation | 221 kPa | 469 kPa |
| Modulus at 300% elongation | 228 kPa | 545 kPa |
| Maximum Tensile | 241 kPa | 662 kPa |

[a]Solution mixing provided a more intimate mixture and was not exposed to the heat produced in milling.
[b]With 2 weight % CHIMASSORB 944, mill mixed at 140° C.

Table 1 shows the rheology and tensile properties and the flow and property differences that resulted from the addition of a polyamine.

Example 13

E/MA/EHM 41/55/4

E/MA/EHM polymer was prepared as in Example 10. The MI of the E/MA/EHM was 800 g/10 min. Two solutions containing 10% and 30% by weight of the E/MA/EHM 41/55/4 copolymer in toluene were prepared. The Brookfield (Model DV-11) viscosities of the solutions were measured at 22° C. initially and after 5 and 10 min. The data are shown in Table 2. A solution of the polyamine CHIMASSORB 944 (25 g) in toluene (100 ml) was prepared and added drop wise to each solution in an amount sufficient to provide 0.65% CHIMASSORB 944 based on the polymer sample weight. The viscosities were measured before adding the CHIMASSORB 944, and immediately after the addition. Viscosities were measured at multiple time periods until a steady state was attained.

The spindle types, spindle numbers, spindle ID settings, and test speeds are shown in Table 2. The solution viscosities of these high MI copolymer samples neutralized with the CHIMASSORB 944 are shown in Table 3.

Example 14

Toluene solutions of a commercial VAMAC G copolymer are prepared at 10 and 30 wt % polymer.

As described in Example 13, a polyamine solution of CHIMASSORB 944 (25 g) is prepared in toluene (100 ml). The 30 wt % solution is much more viscous than the 10% solution. As the polyamine solution is added, the solutions thicken and form gels in the 30 wt % VAMAC G in toluene solution.

A mixture of polyacrylate copolymer with the polyamine is made by mill roll mixing or other mechanical mixing process routinely used in rubber processing. Polyacrylate copolymer (100 g) is added to a two-roll mill set at an operating temperature between about 80° C. up to about 140° C. Once the polymer is banded on the mill, the polyamine is added in increments to milling sample. After each addition, standard milling, cutting and blending operations are performed. The amount of the polyamine added is up to about 100% of the amount needed to neutralize the acid content of the polyacrylate copolymer. After all the polyamine is added, mixing is continued for an additional 5 min. The polymer-polyamine mixture is then removed from the mill. The milled polymer-polyamine mixture is hot pressed into a film by pressing the material between two TEFLON-coated aluminum sheets at ambient temperature and pressure of about 2000 to 4000 psi.

Comparative Example A

Two solutions containing 10% and 30% of a low MI (8 g/10 min.) commercial VAMAC G copolymer in toluene were prepared. The Brookfield (Model DV-11) viscosities of the solutions were measured at 22° C. initially, before the addition of the CHIMASSORB 994. The data are shown in Table 2.

A solution of the polyamine CHIMASSORB 944 (25 g) in toluene (100 ml) was prepared and added drop wise to each solution in an amount sufficient to provide 0.65% CHIMASSORB 944 based on the polymer sample weight. The viscosities were measured at 30 s, 5, and 10 min. after adding the CHIMASSORB 944.

The same spindle types, spindle numbers, spindle ID settings, and test speeds were used as shown in Table 2. The viscosities of the copolymer samples neutralized with the Polyamine are shown in Table 3.

TABLE 2

| Property | Comp Example A (VAMAC G) | | Example 13 (E/MA/EHM) | |
|---|---|---|---|---|
| | 10% MI (8 g/10 min) | 30% | 10% MI (800 g/10 min) | 30% |
| | Instrument Settings | | | |
| Spindle # | 1 | 3 | 1 | 1 |
| Spindle ID Setting* | 61 | 63 | 61 | 61 |
| Test rpm | 60 | 6 | 60 | 30 |
| % of Scale* | 72.3 | 47.5 | 11.5 | 68 |
| | Viscosity, cPs* at 22° C. | | | |
| 0 min. | 73.1 | 9500 | 11.8 | 137 |
| After 5 min. | 73.8 | 10900 | 11.8 | 139 |
| After 10 min. | 74.5 | 15000 | 11.8 | 141 |

*Spindle ID Setting identifies the type of spindle being used in the viscometer. % of Scale shows the instrument is being operated appropriately for the viscosity range. The range should be 10-90% for best accuracy.
**cPs × 0.001 = Pa · s Table 2 shows the effect of concentration on the viscosities for Example 13 (MI 8 g/10 min) and Comparative Example A (MI 800 g/10 min). The viscosity of Comparative Example A increased by more than 2 orders of magnitude on going from 10% to 30% concentration, while the Example 13 polymer only increased by a little more than 1 order of magnitude between the 10% and 30% concentrations. The effect of MW on the solution viscosity was also shown by the comparison of the two 10% and the two 30% samples.

TABLE 3

| Property | Comp. Example A (VAMAC G) | | Example 13 (E/MA/EHM) | |
|---|---|---|---|---|
| | 10% | 30% | 10% | 30% |
| % of Scale | 72.3 | (a) | 11.5 | 68 |
| | Amount of CHIMASSORB 944 Added (ml) | | | |
| | 1.78 | (a) | 1.65 | 4.0 |
| | Viscosity, cPs* at 22° C. | | | |
| Initial(b) | 77.5 | (a) | 11.7 | 143 |
| After 30 s | 88.5 | (a) | 22 | 306 |
| After 5 min. | 122.5 | (a) | 24 | 278 |
| After 10 min. | 160 | (a) | 20.5 | 205 |
| After 15 min. | 137 | (a) | 20.5 | 205 |
| After 20 min. | 167 | (a) | 20.5 | 205 |

(a)The 30% Comparative Example A gelled when the polyamine was added and viscosity measurements could not be made.
(b)Viscosity measurement made before adding polyamine.
*cPs × 0.001 = Pa · s Addition of the polyamine more than doubled the solution viscosity of the 10% solution of Comparative Example A (the commercial copolymer having an MI of 8 g/10 min. Addition of the polyamine gelled the 30% solution of Comparative Example A. In contrast, the addition of the polyamine to the copolymer of Example 13 (MI 800 g/10 min) raised the solution viscosities of both the 10% and 30% samples by ~40 to 50%. Table 3 shows the utility of the high MI copolymers of the present polyamine.

Comparative Example B

An E/MA/AA (41/55/4) copolymer was prepared as in Example 3, and a solution of the copolymer (20 g) in toluene (100 ml) was prepared. Solutions of polyamine (3 g) in toluene (100 ml) and NAUGARD 445 monoamine (3 g) in toluene (100 ml) were prepared.

Following the procedure of Example 13, additions of 0, 1, 2, 3, 4, and 5 ml additions of the solution of CHIMASSORB 944 in toluene were made to the solution of the copolymer in toluene, using a syringe. For each addition, the viscosity was measured at 21° C. initially (after 30 s) and again after 5 min. The viscosity data are shown in Table 4.

Similarly, and again following the procedure of Example 13, additions of 0, 1, 2, 3, 4, and 5 ml additions of the solution of NAUGARD 445 monoamine in toluene were made to the solution of the copolymer in toluene, using a syringe. For each addition, the viscosity was measured at 21° C. initially (after 30 s) and again after 5 min. The viscosity data are also shown in Table 4.

For both the polyamine and monoamine solutions, each ml addition corresponds to 0.15 wt % additive based on the amount of the E/MA/AA (41/55/4) copolymer.

TABLE 4

| Property | Comparative Example B | |
|---|---|---|
| | Instrument Settings | |
| Spindle # | 2 | |
| Spindle ID Setting | 62 | |
| Test rpm | 60 | |
| % of Scale | 16-23 | |
| | Viscosity, cPs* at 21° C. | |
| | CHIMASSORB 944 (Polyamine) | |
| Polyamine solution added(a) | Initial Viscosity (after 30 s) | Viscosity after 5 minutes |
| 0 ml | 111 | 111 |
| 1 ml | 139 | 128 |
| 2 ml | 154 | 143 |
| 3 ml | 177 | 160 |
| 4 ml | 206 | 187 |
| 5 ml | 238 | 220 |
| | NAUGARD 445 (Monoamine) | |
| NAUGARD 445 solution added(a) | Initial Viscosity (after 30 s) | Viscosity after 5 minutes |
| 0 ml | 97 | 92 |
| 1 ml | 102 | 92.7 |
| 2 ml | 97.2 | 92.2 |
| 3 ml | 98.5 | 92.7 |
| 4 ml | 98.5 | 92.2 |
| 5 ml | 95 | 89.2 |

(a)Each ml of polyamine or monoamine solutions corresponds to 0.03 gm of the polyamine or monoamine, and corresponds to an addition of 0.15 wt % polyamine or monoamine based on the E/MA/AA copolymer.
*cPs × 0.001 = Pa · s Table 4 shows that the monoamine did not increase the solution viscosity of the low MW E/MA/AA polymer at the additive levels used. The final level of additive in each case was 0.75% based on polymer. In contrast, the polyamine at least doubled the solution viscosity. Table 4 shows the increase of viscosity with the addition of the polyamine, and the absence of an increase in viscosity with the monoamine, thus the monoamine was not a substitute for the polyamine in generating labile cross-linked film-forming solutions in the practice of the present invention.

The invention claimed is:

1. A composition comprising or produced from an ethylene acid copolymer and a curing agent wherein the acid copolymer has a melt index of greater than about 110 g/10 minutes; the acid copolymer comprises repeat units derived from ethylene, at least one alkyl (meth)acrylate, at least one acid comonomer, and optionally another comonomer; the acid comonomer includes (meth)acrylic acid, monoalkyl ester of 1,4-butene-dioic acid, or combinations thereof and the another comonomer includes maleic acid ester, maleic anhydride, or combinations thereof; the curing agent include poly[[6-(1,1,3,3-tetramethylbutyl)amino-s-triazine-2,4-diyl][(2,2,6,6-tetramethyl-4-piperidyl)imino]hexamethylene[(2,2,6,6-tetramethyl-4-piperidyl)imino]], an oligomeric polyamine including about 2 to about 100 amine groups, or combinations thereof.

2. The composition of claim 1 further comprising or produced from an additive and optionally a solvent wherein the additive includes antioxidant, thermal stabilizer, ultraviolet light stabilizer, pigment, dye, filler, anti-slip agent, plasticizer, other processing aid, or combinations of two or more thereof and the solvent includes toluene, ether, acetone, tetrahydrofuran, or combinations of two or more thereof.

3. The composition of claim 2 wherein the composition comprises the another comonomer.

4. The composition of claim 3 wherein maleic acid ester includes maleic acid diester, maleic acid monoester, or both and is an ester of a $C_1$-$C_4$ alcohol.

5. The composition of claim 1 wherein composition comprises the another comonomer.

6. The composition of claim 5 wherein maleic acid ester includes maleic acid diester, maleic acid monoester, or both and is an ester of a $C_1$-$C_4$ alcohol.

7. The composition of claim 5 further comprising the solvent wherein the solvent includes toluene, ether, acetone, tetrahydrofuran, or combinations of two or more thereof and the composition is a solution or dispersion.

8. The composition of claim 7 further comprising a substrate having applied thereon the composition wherein the substrate is metal, glass, ceramic, tile, brick, concrete, wood, masonry, fiber, leather, plastics, elastomer including rubber, or stone.

* * * * *

UNITED STATES PATENT AND TRADEMARK OFFICE
CERTIFICATE OF CORRECTION

PATENT NO. : 7,598,321 B2  Page 1 of 1
APPLICATION NO. : 11/498216
DATED : October 6, 2009
INVENTOR(S) : Charles J. Talkowski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 70 days.

Signed and Sealed this

Twenty-eighth Day of September, 2010

David J. Kappos
*Director of the United States Patent and Trademark Office*